Figure 1:
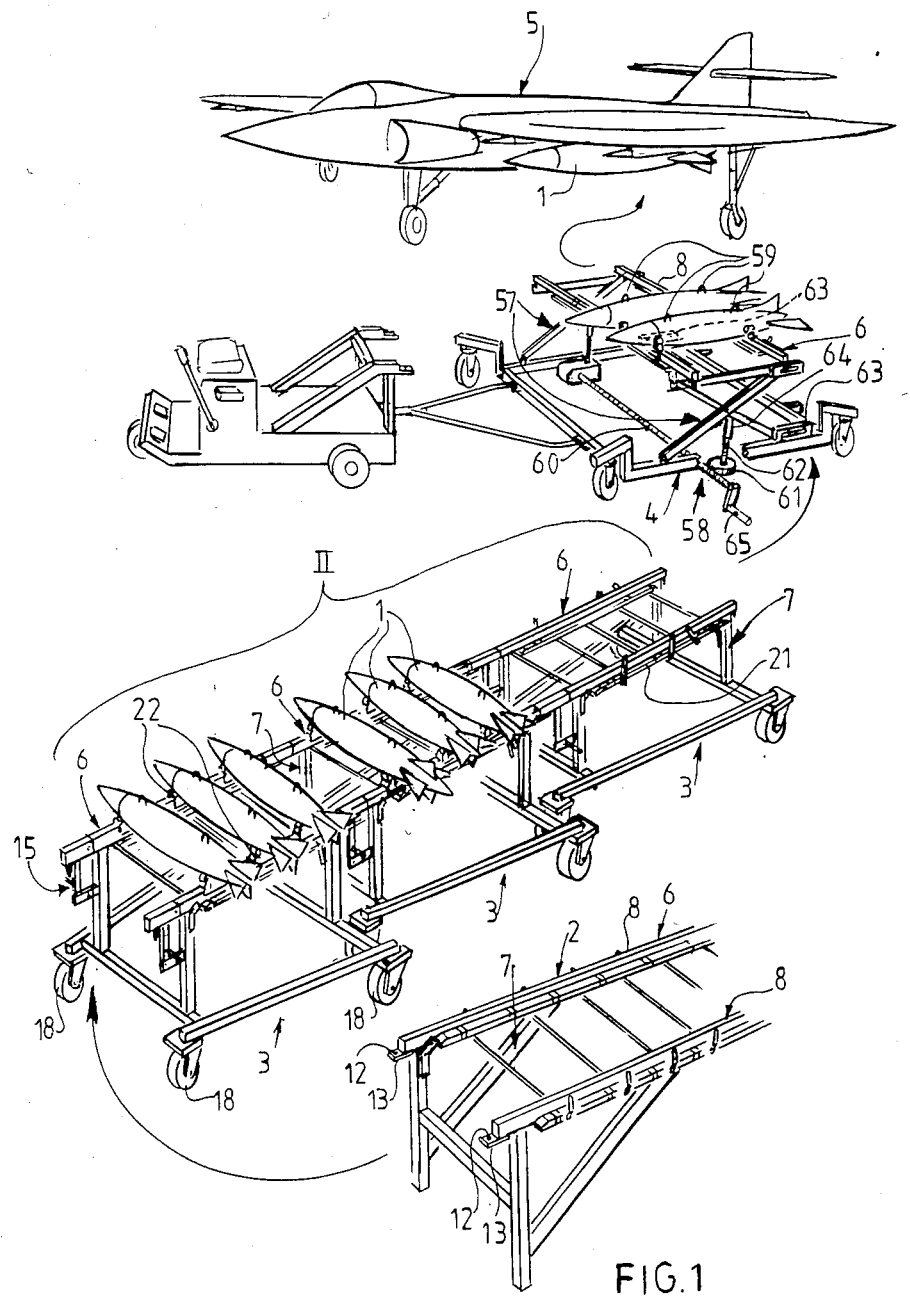

United States Patent [19]

Versteeg

[11] Patent Number: 4,787,788
[45] Date of Patent: Nov. 29, 1988

[54] DEVICE FOR CARRYING BOMBS

[75] Inventor: Gijsbert Versteeg, Nunspeet, Netherlands

[73] Assignee: B.V. Industriele Handelsondernedming, Etc., Nunspeet, Netherlands

[21] Appl. No.: 57,906

[22] Filed: Jun. 2, 1987

[30] Foreign Application Priority Data

Jun. 2, 1986 [NL] Netherlands ............. 8601419

[51] Int. Cl.⁴ .................... B60P 1/52; B64D 7/00
[52] U.S. Cl. ........................... 410/49; 410/67; 410/78; 410/80; 410/84; 414/343; 211/70.4; 104/48; 104/137; 104/250
[58] Field of Search ........ 104/107, 118, 137, 249–252, 104/48; 211/59.4, 70.4; 238/10 R; 410/2, 47, 49, 52, 66, 67, 77, 78, 80, 84; 414/343, 339, 402, 572, 589, 590

[56] References Cited

U.S. PATENT DOCUMENTS

| | | | |
|---|---|---|---|
| 679,567 | 7/1901 | Lowe | 414/343 |
| 748,823 | 1/1904 | Weaning | 104/249 X |
| 1,130,055 | 3/1915 | Baum | 104/251 |
| 1,835,133 | 12/1931 | Bergen, Jr. | 410/52 X |
| 2,619,916 | 12/1952 | Rainier | 104/250 X |
| 3,067,884 | 12/1962 | Williams | 414/590 X |
| 3,111,912 | 11/1963 | Keiter | 104/249 X |
| 3,262,664 | 7/1966 | Paraskewik | 410/49 |
| 3,268,093 | 8/1966 | Keiter | 414/590 X |
| 3,866,539 | 2/1975 | Gasser | 104/249 |
| 4,288,193 | 9/1981 | Klausbruckner et al. | 414/342 |

Primary Examiner—Robert B. Reeves
Assistant Examiner—Scott H. Werny
Attorney, Agent, or Firm—John P. Snyder

[57] ABSTRACT

A bomb handling system includes a plurality of mobile frames, each having a pair of rails and carrying members on the rails. Each pair of carrying members supporting corresponding ends of a bomb and there being locking mechanisms with separate, common actuators at particular locations along the lengths of the rails selectively to arrest a pair of carrying members in transversely aligned positions at a location and to allow such pair to travel past a location. The mobile frames may be attached in a train with their pairs of rails in end-abutting relation and including blocking mechanisms which releasably prevent transfer of a pair of carrying members from one frame to the next. A mobile frame may include a mechanism to elevate its rails so that loaded and positioned bombs may be raised for attachment to an aircraft.

11 Claims, 6 Drawing Sheets

DEVICE FOR CARRYING BOMBS

This invention relates to a device for carrying bombs in which carrying members are associated with a frame and are required to be locked with respect thereto.

In the known device of the above stated type the carrying members are locked on the frame by arranging the carrying members at the required carrying location and then placing the locking members in the locking position, whereby the stop members are then enclosed by the locking members. In order to be able to effect this locking, the carrying members have to be placed in their position, otherwise the locking members cannot be set in their locking position.

The invention has for its object to lock carrying members for bombs on a frame easily and therefore quickly and safely.

In the device according to the invention the locking members are set beforehand in their catch position without a time consuming search procedure and they then catch the carrying members automatically.

Mentioned and other advantages of the invention will be elucidated in the description following hereafter with reference to a drawing.

Figure 2:
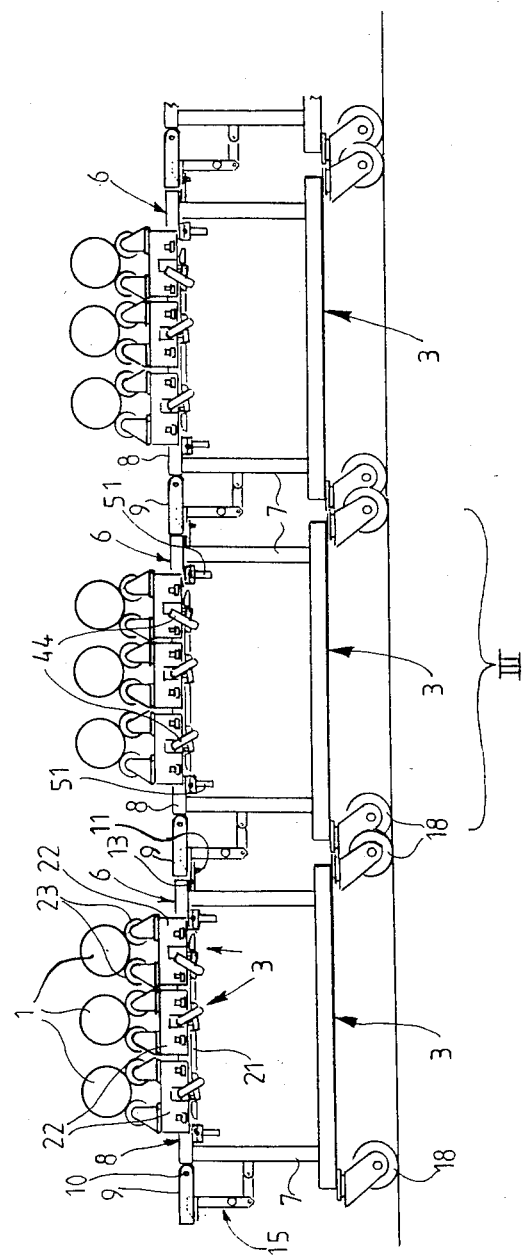
Figure 3:
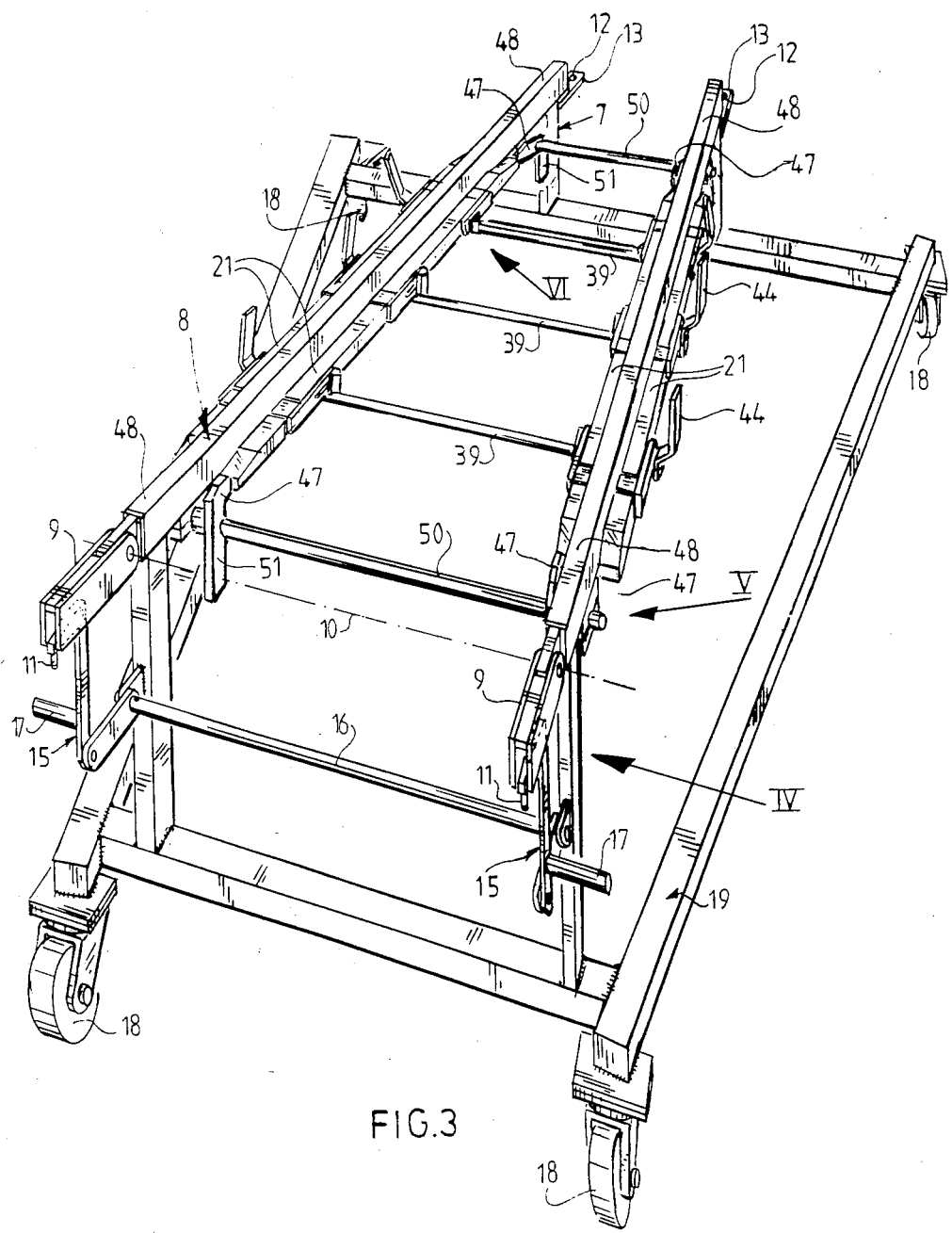
Figure 4:
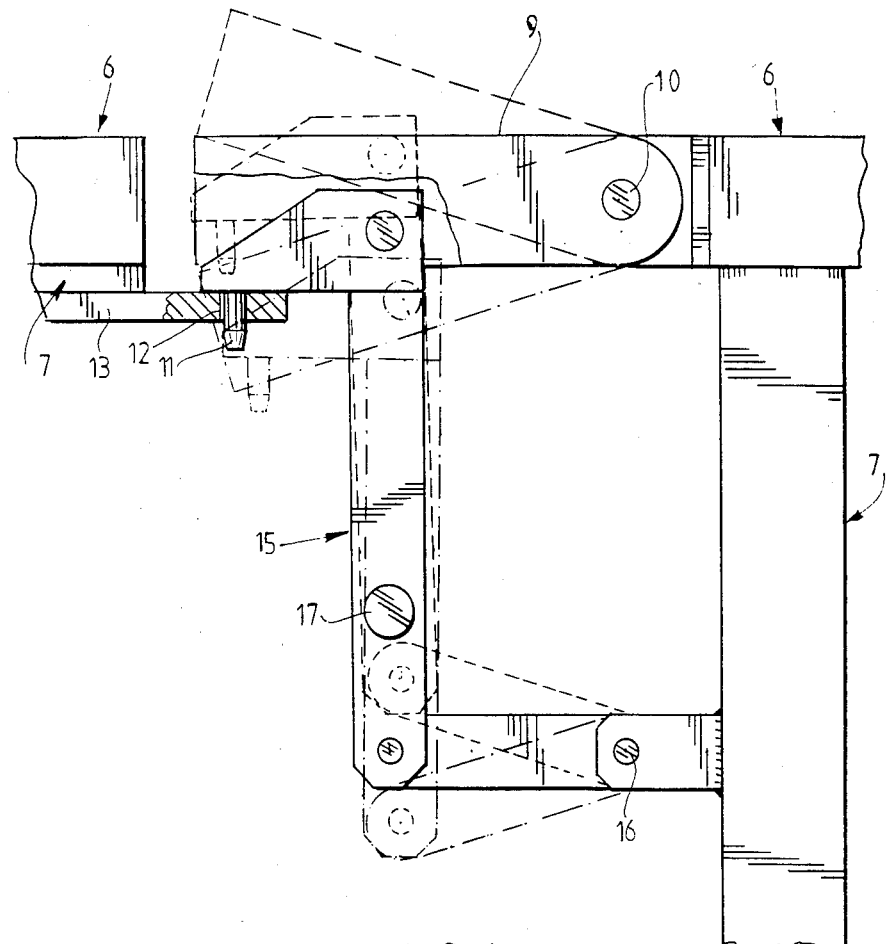
Figure 5:
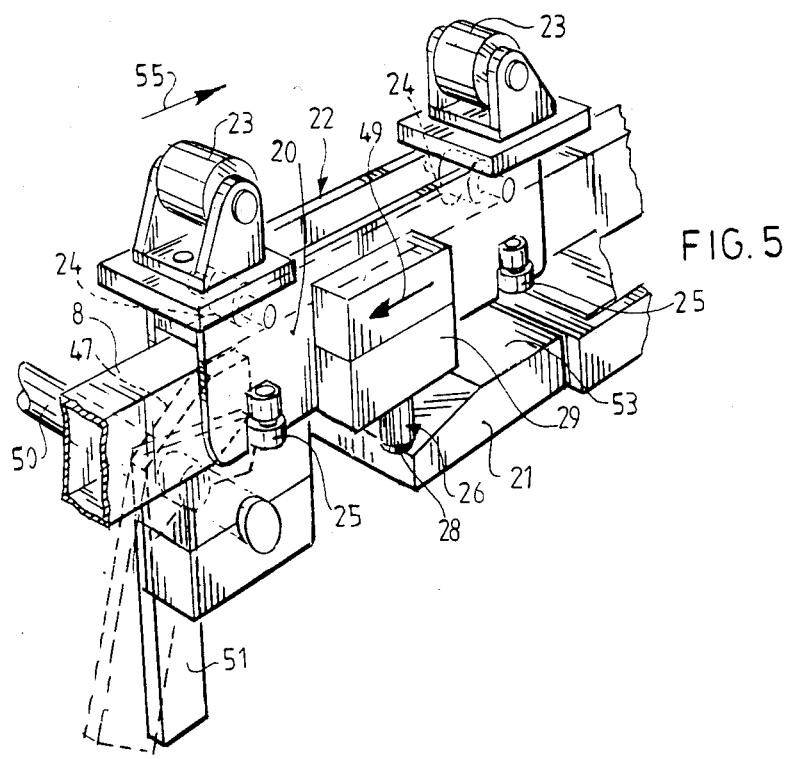
Figure 6:
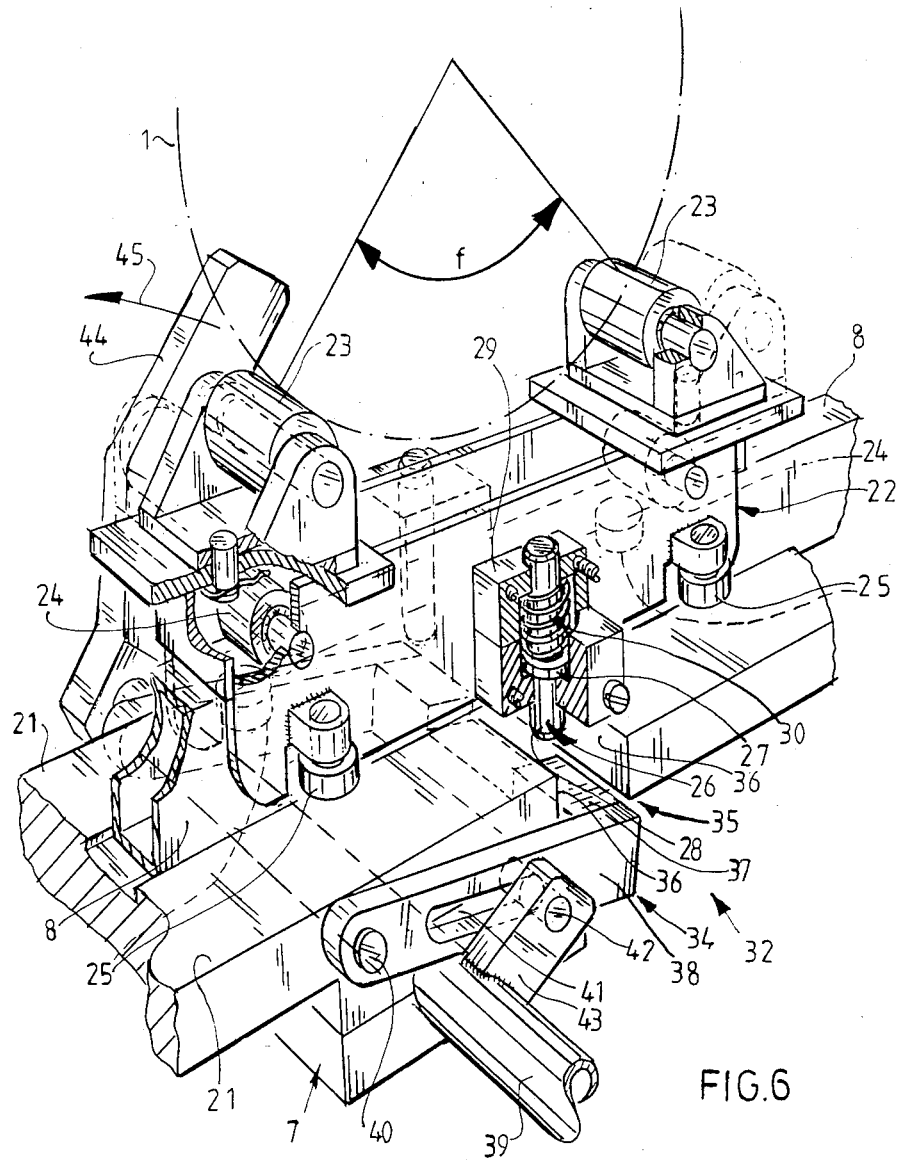

In diagram form in the drawing:

FIG. 1 shows a perspective, schematic view of transportation means for transferring bombs from a bomb magazine to a bomber aircraft, FIG. 2 shows a side view of detail II from FIG. 1 on a larger scale, FIG. 3 shows on a larger scale a perspective view of detail III from FIG. 2, FIG. 4 is detail IV from FIG. 3 on a larger scale, FIG. 5 is detail V from FIG. 3 on a larger scale, and FIG. 6 is detail VI from FIG. 3 on a larger scale.

As according to FIG. 1 bombs 1 are conveyed by means of transport trolleys 3 from a fixed magazine 2 to a bomber aircraft 5, and suspended on a bomber aircraft 5 by means of a lift truck 4. The magazine 2, each transport trolley 3 and each lift truck 4 has a device 6 according to the invention for carrying bombs 1. The preferred embodiment of the device 6 according to the invention, as shown in the FIGS. 1-6, comprises a frame 7 and two parallel, horizontal rails 8, each of which are provided at their one end with an extension piece 9 (FIG. 4), which is coupled for pivoting on a common horizontal axis 10 with the associated rail 8 and which has on its free end a vertical connecting pin 11 which fits into a coupling hole 12 of a coupling piece 13 which is arranged on the other end of a similar frame 7 of another device 6. Both extension pieces 9 are coupled to each other by means of parallelogram systems 15 and a coupling shaft 16 and can therefore be actuated in one single operation, that is, with one hand, by means of actuating members 17 located on either side of frame 7, for coupling onto the rails 8 of another device 6. The frame 7 of each transport trolley 3 has a trapezoidal shaped underframe 19 such that the underframe 19 is narrower at the one end than at the other end, with the result that the underframes 19 of two transport trolleys 3 can penetrate into each other with their wheels 18.

Present alongside each tubular rail 8 is a slide frame 21. Each device 6 preferably comprises a plurality of pairs of carrying members 22. A bomb 1 is supported on each of both its ends by a carrying member 22. Each carrying member 22 has for this purpose two supporting rollers 23 which accommodate a bomb 1 between them at an angle f of for example 90°, or preferably slightly more. Carrying member 22 is supported on rail 8 by means of two horizontal travelling rollers 24 and is guided at its four corners relative to rail 8 by means of four vertical guide rollers 25. Carrying member 22 has on both sides a stop member 26 consisting of a vertical pin 28 with a bulge 27 which is guided in a guide block 29 in vertical direction and whereby a compression spring 30 grips onto pin 28 above bulge 27, in order to force this stop member 26 downward onto the slide frames 21. Each slide frame 21 has at each carrying location 32 for a bomb 1 a locking member 34 which is formed by stops 36 bounding an accommodation space 35 arranged in a slide frame 21 for a stop member 26. The accommodation space 35 can be closed off by means of a closing device 37 which consists of a filling piece attached to a pivoting arm 38 which can pivot on a pivot shaft 40. Pivoting arm 38 has a slotted hole 41 for accommodating and guiding a pin 42 attached to a crank arm 43. Four crank arms 43 associated with four slide frames 21 of one and the same carrying location 32 are attached to a common actuating shaft 39 mounted for rotation on the frame 7, which shaft has on each side of frame 7 an actuating member 44 which can be adjusted as according to arrow 45 from a catch position drawn in FIG. 6 in full lines to a position allowing passage, whereby the closing devices 37 then substantially fill up the accommodation spaces 35 in the slide frames 21 and as a result close off access to the accommodation spaces 35 for stop members 26.

When two carrying members 22, which together carry one and the same bomb 1, are displaced over the rails 8 and then arrive at a determined carrying location 32, where the four catch members 23 are situated in the catch position drawn in FIG. 6, the four stop members 26 are then caught because the pins 25 sliding over the slide frame 21 and held up by the slide frame 21 counter to the action of compression springs 30, which form automatic pressure means, are forced into the free spaces 35. In this way the bomb 1 is then held in place at this carrying location 32. In the case that the catch members 33 are in the position allowing passage, both carrying members 22 with their bomb 1 will pass by this carrying location 32 and continue rolling until they arrive at another carrying location 32, of which all the catch members 33 are situated in their catch position.

Each frame 7 has on all rail ends 48 a safety ratchet 47 which, in the ratchet position drawn with full lines in FIG. 5, blocks the frame 20 of a carrying member 22 which is leaving rail end 48 as according to arrow 49. Two safety ratchets 47 are firmly attached to a common control shaft 50 which is mounted for rotation in frame 7 and which has a downward directed control member 51 on either side of frame 7. Through their own weight both the control members 51 force ratchets 47 automatically upward into the catch position. Only when it is required that carrying members 22 with their bomb 1 leave the frame 7 are the ratchets 47 held in the passing position drawn with dashed lines in FIG. 5. FIG. 5 shows that slide frames 21 have an end 53 rising at a slope, as a result of which pins 26 are pressed upward counter to spring action when the relevant carrying member 22 arrives on a frame 7 as according to arrow 55.

The level of frame 7 of lift truck 4 can be changed relative to the chassis 56 by means of scissor constructions 57 having two horizontal guides 63 and a lifting mechanism 58, with the result that bombs 1 can easily be suspended on a bomber aircraft 5 by means of ears 59. Lifting mechanism 58 comprises a horizontal screw shaft 60 which engages two worm wheels 61 which are connected to two upright screwed rods 62 which cooperate telescopically with screwed bushes 64. The height of the device 6 can be adjusted by turning the screw shaft 60 by means of tool 65.

I claim:

1. A transportation device for handling bombs, which comprises the combination of a frame, a pair of rails on the frame and disposed in spaced apart relation to each other, a pair of carrying members, each guided along a respective one of the rails and each carrying member having means for cradling a bomb, locking means, including a stop member on each carrying member, cooperating between the frame and the carrying members for positively locating the carrying members at a transverse, aligned location along the lengths of the rails, catch members adjacent the rails and including springs urging the stop members into arrested relation to the catch members, and control means for selectively actuating the locking means between operative condition in which the carrying members are arrested at the aligned location and inoperative condition in which the carrying members are not arrested at the aligned location, the control means including a common actuator.

2. In a system for handling bombs, the combination of a plurality of separate wheeled frames, a pair of rails on each frame and disposed thereon in a particular spaced apart relation to each other so that the rails of any two frames may be disposed in end-abutting relation for transferring bombs from one set of rails to another, means for selectively coupling a pair of frames so that their rails are in end-abutting relation, a plurality of pairs of carrying members, each pair of carrying members guided along a respective one of the rails and each carrying member having means for cradling a bomb, locking means cooperating between the frame and the carrying members for positively locating the carrying members at transverse, aligned locations along the lengths of the rails, and control means at each location for selectively actuating the locking means between operative condition in which the carrying members are arrested at an aligned location and inoperative condition in which the carrying members are not arrested at such aligned location, said locking means comprising a portion of each frame adjacent to each rail thereof and having gaps therein in which pairs of gaps of the frame portions are aligned at each aligned location, a filler member for each gap and movable thereinto, the control means being connected with each pair of filler members.

3. In a system as defined in claim 2 including stop means at the ends of each rails.

4. In a system as defined in claim 3 wherein each frame has a wheeled, trapezoidal base so that the frames may be partly nested in end-to-end relation.

5. In a system for handling bombs, the combination of a mobile frame and a pair of rails on the frame disposed in parallel relation thereon to define an entrance end of the rails and a remote end of the rails, a plurality of pairs of carrying members, each pair of carrying members guided along a respective one of the rails and each carrying member having means for cradling a corresponding end of a bomb so that each bomb is supported by a pair of carrying members on the rails while extending transversely thereof, locking means for positively locating the pairs of carrying members at specific transverse, aligned locations along the lengths of the rails from the entrance end toward the remote end of the rails, and control means at each location for loading the mobile frame with a plurality of bombs in reverse sequence toward the entrance end of the rails by selective and separate actuation of the locking means from an inoperative condition in which the carrying members are not arrested at such aligned location to an operative condition in which the pairs of carrying members are arrested at an aligned location.

6. In a system for handling bombs as defined in claim 5 including means for elevating the rails for disposition of the loaded bombs thereon beneath an aircraft for attachment thereto.

7. In a system as defined in claim 6 including a second mobile frame having a second pair of rails on the second frame disposed in parallel relation thereon to define an entrance end and a remote end of the second pair of rails, a plurality of pairs of second carrying members, each pair of second carrying members guided along a respective one of the second rails and each second carrying member having means for cradling a corresponding end of a bomb so that each bomb is supported on the second rails while extending transversely thereof, second locking means for positively locating the pairs of second carrying members at transverse, aligned locations along the lengths of the second rails from the entrance end toward the remote end of the second rails, and second control means at each location of the second rails for loading the second mobile frame with a plurality of bombs in reverse sequence toward the entrance end of the second rails by selective and separate actuation of the second locking means from an inoperative condition in which the second carrying members are not arrested at such aligned location to an operative condition in which the pairs of second carrying members are arrested at an aligned location, the first and second rails being spaced apart by the same amount, and coupling means for coupling the first and second mobile frames together with their respective rails in end-abutting relation whereby bombs loaded on the second mobile frame may be transferred to the first mobile frame.

8. In a system as defined in claim 7 including blocking means at the remote ends of the rails for selectively preventing travel of a pair of carrying members past the remote ends of the rails.

9. In a system as defined in claim 5 including a second mobile frame having a second pair of rails on the second frame disposed in parallel relation thereon to define an entrance end and a remote end of the second pair of rails, a plurality of pairs of second carrying members, each pair of second carrying members guided along a respective one of the second rails and each second carrying member having means for cradling a corresponding end of a bomb so that each bomb is supported on the second rails while extending transversely thereof, second locking means for positively locating the pairs of second carrying members at transverse, aligned locations along the lengths of the second rails from the entrance end toward the remote end of the second rails, and second control means at each location of the second rails for loading the second mobile frame with a plurality of bombs in reverse sequence toward the entrance end of the second rails by selective and separate actuation of the second locking means from an inoperative condition in which the second carrying members are not arrested at such aligned location to an operative condition in which the pairs of second carrying members are arrested at an aligned location, the first and second rails being spaced apart by the same amount, and means for coupling the first and second mobile frames together with their respective rails in end-abutting relation whereby bombs loaded on the second mobile frame may be transferred to the first mobile frame.

10. In a system as defined in claim 9 including blocking means at the remote ends of the rails for selectively preventing travel of a pair of carrying members past the remote ends of the rails.

11. In a system for handling bombs as defined in claim 9 wherein the first mobile frame includes means for elevating the rails thereof for disposition of the loaded bombs thereon beneath an aircraft for attachment thereto.

* * * * *